United States Patent [19]

Kitajima

[11] Patent Number: 5,350,291
[45] Date of Patent: Sep. 27, 1994

[54] MOLD OPENING AND CLOSING APPARATUS FOR ELECTRIC INJECTION MOLDING MACHINE

[75] Inventor: Masaya Kitajima, Chiba, Japan

[73] Assignee: Sumitomo Heavy Industries, Ltd., Tokyo, Japan

[21] Appl. No.: 72,942

[22] Filed: Jun. 8, 1993

[30] Foreign Application Priority Data

Jun. 12, 1992 [JP] Japan ................... 4-177650

[51] Int. Cl.$^5$ ............................................ B29C 45/66
[52] U.S. Cl. ................................. 425/593; 100/281; 425/451.6
[58] Field of Search ............... 100/281; 425/592, 593, 425/451.5, 451.6

[56] References Cited

U.S. PATENT DOCUMENTS

| | | | |
|---|---|---|---|
| 3,830,614 | 8/1974 | Kurtz | 425/451.6 |
| 4,034,666 | 7/1977 | Bigun et al. | 100/281 |

FOREIGN PATENT DOCUMENTS

| | | |
|---|---|---|
| 0366810A1 | 5/1990 | European Pat. Off. . |
| 736708 | 5/1943 | Fed. Rep. of Germany . |
| 1193405 | 6/1970 | United Kingdom . |

*Primary Examiner*—James Mackey
*Attorney, Agent, or Firm*—Nikaido, Marmelstein, Murray & Oram

[57] ABSTRACT

A mold opening and closing apparatus for an electric injection molding machine which performs mold opening and closing actions by a toggle link mechanism having a first arm rotatably supported by a toggle support, a second arm pivotally joined to the first arm and to a movable platen, and an electric drive device for rotating the first arm. The apparatus includes a coil spring for urging the first arm toward a mold opening position of the first arm. The moment caused by the weight of the first and second arms in their mold clamping positions can be canceled by the virtue of the coil spring, thereby enabling the machine to exhibit improved performance of low-pressure mold clamping force.

3 Claims, 2 Drawing Sheets

MOLD OPENING AND CLOSING APPARATUS FOR ELECTRIC INJECTION MOLDING MACHINE

BACKGROUND OF THE INVENTION

1. Field of the Invention

The present invention relates to a mold opening and closing apparatus for an electric injection molding machine.

2. Description of the Related Art

In an injection molding machine, an electric injection molding machine having an electric motor as the drive source and having a single toggle mechanism for opening and closing the mold and for clamping the mold, is known. Such a mechanism entails a problem in which, in the vicinity of the fully closed position of the mold, a low-pressure mold clamping action cannot be controlled properly due to a moment caused by the weight of the toggle link of the mechanism. This problem is conspicuous when the machine is of a large size.

SUMMARY OF THE INVENTION

An object of the present invention is to improve the performance of an electric injection molding machine when it uses a low-pressure mold clamping force.

According to the present invention, there is provided a mold opening and closing apparatus for an electric injection molding machine, comprising: a toggle support; tie bars connecting a stationary platen with the toggle support; a movable platen supported in such a manner as to be slidable on the tie bars; and a toggle link mechanism disposed between the toggle support and the movable platen for advancing and retracting the movable platen with respect to the stationary platen to a mold clamping position and a mold opening position, respectively, of the :movable platen, the toggle link mechanism comprising a first arm rotatably supported by the toggle support, a second arm having a first end pivotally joined to the distal end of the first anti and a second end pivotally joined to the movable platen, and an electric drive device for rotating the first arm. The apparatus further comprises a spring device for urging the first arm toward a position at which a mold is opened.

DESCRIPTION OF THE PREFERRED EMBODIMENT

Figure 1:
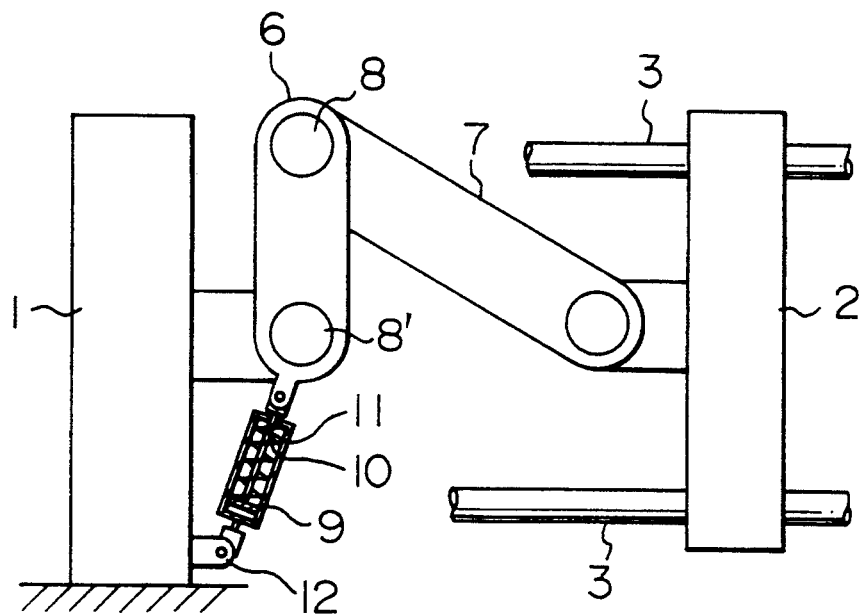
FIG. 1 is a side view schematically showing a mold opening and closing apparatus for an electric injection molding machine according to one embodiment of the present invention.
Figure 2:
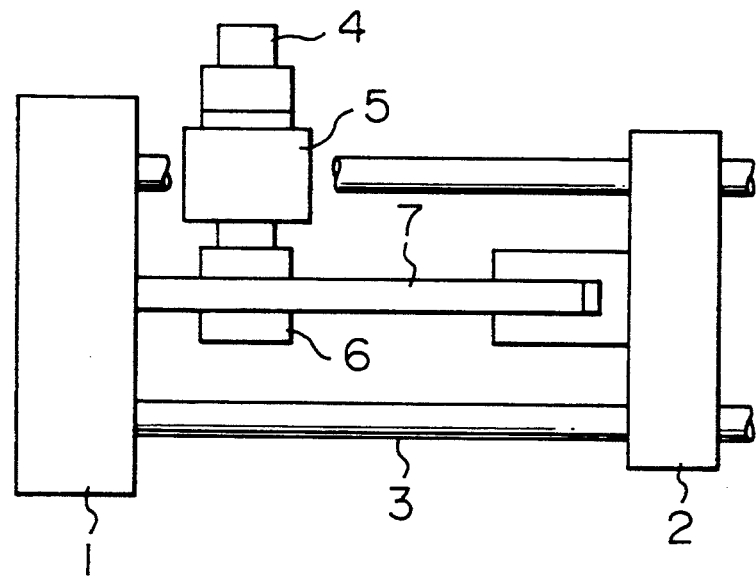
FIG. 2 is a plan view of the apparatus according to the present invention.
Figure 3:
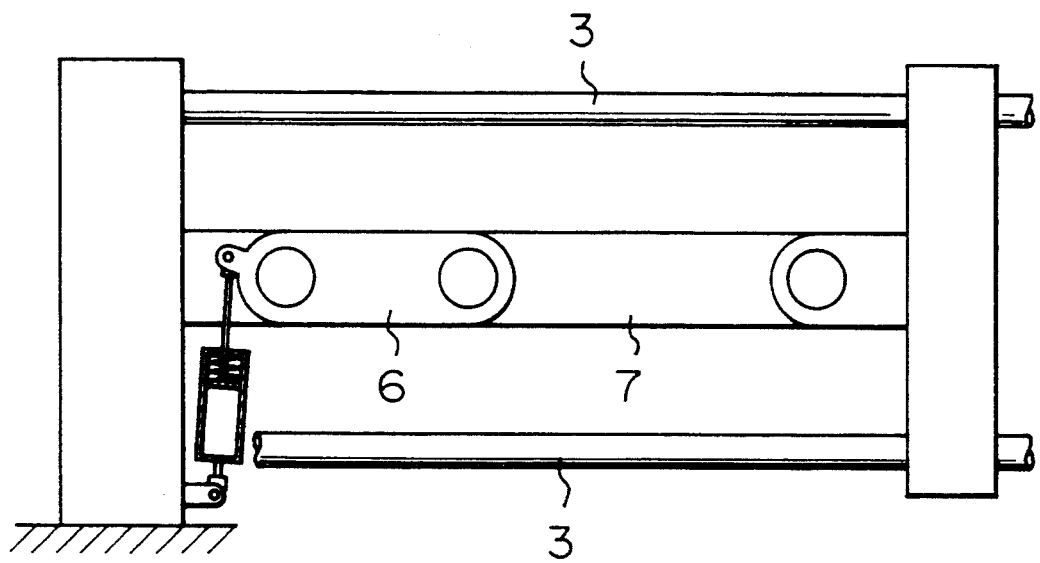
FIG. 3 is a side view schematically showing the apparatus in its mold clamping state.

An embodiment of the present invention will be described with reference to FIGS. 1 to 3. A toggle support 1 is connected to a stationary platen (not shown) by a plurality of tie bars 3. A movable platen 2 is able to slide on the tie bars 3. The toggle support 1 is linked no the movable platen 2 by a toggle link mechanism including, as shown in FIG. 1, a first arm 6 having a first end supported by the toggle support 1 in such a manner as to be rotatable about a pin 8', and a second arm 7 having a first end pivotally joined to a second end of the first arm 6 by another pin 8. A motor 4 and a reduction gear 5 for rotating the first arm 6 are mounted on the toggle support 1, the motor 4 having a rotary shaft coaxial with the axis of the pin 8'. A cylinder 9 is pivotally joined to the toggle support 1 by a pin 12. The cylinder 9 receives therein a rod 11 having a spring retainer provided at the lower end of the rod 11, as viewed in FIG. 1, and a coil spring 10 surrounding a portion of the rod 11 and disposed between the spring retainer and the wall at the upper end of the cylinder 9. The other, or upper, end of the rod 11 projects from the cylinder 9, and is connected to the first end of the first arm 6 at which the pin 8' is provided.

When the motor 4 is rotated, the first arm 6 is rotated through the reduction gear 5 about the pin 8', causing, through the link between the first and second arms 6 and 7, the movable platen 2 to advance or retract on the tie bars 3 for effecting a mold closing or mold opening action, respectively. In the state of the apparatus in which the mold is fully open (FIG. 1), the coil spring 10 applies either substantially no force to the arm 6 when the coil spring 10 is free from mounting deformation, or only a minute force due to initial deformation. As the movable platen 2 advances, the coil spring 10 is compressed so as to apply, the first arm 6, a force urging the arm 6 toward a position at Which a mold is opened (i.e., force urging the arm 6 backward). In the state of the apparatus in which the mold is fully closed (FIG. 3), a moment caused by the weight of the link comprising the two arms 6 and 7 is balanced With a moment caused by the resilient force of the coil spring 10.

In the single toggle mechanism, therefore, the influence of a moment caused by the link weight can be eliminated by the coil spring 10 acting on the link member 6, thereby providing the effect of improving the performance of the machine when a low-pressure clamping force acts on the mold being closed.

What is claimed is:

1. A mold opening and closing apparatus for an electric injection molding machine, comprising:
    a toggle support;
    tie bars connecting a stationary platen with said toggle support;
    a movable platen supported in such a manner as to be slidable on said tie bars; and
    a toggle link mechanism disposed between said toggle support and said movable platen for advancing and retracting said movable platen with respect to said stationary platen to a mold clamping position and a mold opening position, respectively, of said movable platen, said toggle link mechanism comprising a first arm rotatably supported by said toggle support, a second arm having a first end pivotally joined to the distal end of said first arm and a second end pivotally joined to said movable platen, and an electric drive device for rotating said first arm,
    said apparatus further comprising a spring device for urging said first arm toward a position at which said movable platen is retracted to said mold opening position.

2. An apparatus according to claim 1, wherein said electric drive device includes an electric motor mounted on said toggle support and having a rotary shaft coaxial with the axis of rotation of said first arm.

3. An apparatus according to claim 1 or claim 2, wherein said spring device comprises a cylinder having a first end pivotally joined to said toggle support, a rod having at a first end thereof a spring retainer movable within said cylinder in the axial direction of said cylinder and having a second end pivotally joined to the proximal end of said first arm at which the axis of rotation of said first arm extends through said first arm, and a coil spring received in said cylinder and surrounding a portion of said rod, said coil spring being disposed between said spring retainer and a wall of said cylinder at a second end thereof.

* * * * *